United States Patent
Harnack et al.

(10) Patent No.: US 6,888,150 B2
(45) Date of Patent: May 3, 2005

(54) METHOD FOR DEFECT AND CONDUCTIVITY ENGINEERING OF A CONDUCTING NANOSCALED STRUCTURE

(75) Inventors: Oliver Harnack, Stuttgart (DE); Jurina Wessels, Stuttgart (DE); William E. Ford, Stuttgart (DE); Akio Yasuda, Stuttgart (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 10/316,722

(22) Filed: Dec. 11, 2002

(65) Prior Publication Data

US 2003/0178580 A1 Sep. 25, 2003

(30) Foreign Application Priority Data

Dec. 13, 2001 (EP) .............................. 01129710

(51) Int. Cl.$^7$ ............................... H01J 37/26
(52) U.S. Cl. ................... 250/492.2; 250/310
(58) Field of Search ............................ 250/492.2, 310, 250/307; 324/751, 501, 538, 158 R (56) References Cited

U.S. PATENT DOCUMENTS

| | | | |
|---|---|---|---|
| 4,880,496 A | | 11/1989 | Nebenzahl et al. |
| 4,933,552 A | * | 6/1990 | Lee ........................... 250/310 |
| 4,943,769 A | * | 7/1990 | Golladay et al. ........... 324/751 |
| 5,583,344 A | | 12/1996 | Mizumura et al. |
| 6,300,629 B1 | | 10/2001 | Lawrence ................... 250/310 |
| 2001/0027917 A1 | | 10/2001 | Ferranti et al. |

FOREIGN PATENT DOCUMENTS

| WO | WO 90 14683 | 11/1990 |
|---|---|---|
| WO | WO 02 27404 | 4/2002 |

OTHER PUBLICATIONS

Patent Abstracts of Japan vol. 013, No. 268 (E–775), Jun. 20, 1989, & JP 01 059750 A (Mitsubishi Electric Corp), Mar. 7 1989.

* cited by examiner

*Primary Examiner*—Kiet T. Nguyen
(74) *Attorney, Agent, or Firm*—Frommer Lawrence & Haug LLP; William S. Frommer; Matthew K. Ryan (57) ABSTRACT

The invention relates to a method for defect and conductivity engineering of an individual part in a conducting nanoscaled structure by generating heat-induced migration, melting, sputtering and/or evaporation of conductive material of the nanoscaled structure by directing a focussed electron beam on this individual part of the structure to be engineered. The invention further relates to the use of a secondary electron microscope having a filter for detecting back scattered electrons for such a method and a respective secondary electron microscope having such a filter for detecting back scattered electrons.

21 Claims, 5 Drawing Sheets

METHOD FOR DEFECT AND CONDUCTIVITY ENGINEERING OF A CONDUCTING NANOSCALED STRUCTURE

The invention is related to a method for defect and conductivity engineering of an individual portion or an individual region in or an element of a nanoscaled structure. The term "defect and conductivity engineering" has to be understood in the sense of this invention in its broadest possible extent and comprises both a defect repairing of conducting nanoscaled structures, i.e. a connecting of nanoscaled structures having a gap between gap edges, as well as the amendment or tuning of the conductivity of an individual part in a nanoscaled structure, i.e. both enhancing and lowering of the conductivity in specific portions or elements of the nanoscaled structure. With the term "engineering of an individual portion" all treatments are covered, which are directed and targeted only to a portion, a part of the nanoscaled structure and not simultaneously treating the complete nanoscaled structure in an identical way, i.e. by heating a substrate with a nanoscaled structure completely.

In the publication "Carbon Nanotube Template Self-Assembly and Thermal Processing of Gold Nanowires" of S. Fullam (Advanced Materials (2000), 12, No. 19, pages 1430 ff.) a method for enhancing conductivity of a nanoscaled structure assembly is disclosed, wherein the complete assembly is heated to higher temperatures in the area of 300° C. for a time of up to 120 seconds, generating a fusion between neighboring crystals of the nanoscaled structure.

Florian Banhart disclosed in his publication "The Formation of a Connection between Carbon Nanutubes in an Electric Beam" (Nano Letters 2001, Vol. 1, No. 6, pages 329 to 332) the possibility of connecting crossing mulitwalled nanotubes by aggregating hydrocarbons and transferring them into amorphous carbon, which is immobile and remains in the irradiated area, whereby two crossed nanotubes are soldered together and a mechanical junction is established between them.

T. R. Groves describes in his publication "Theory of beam-induced substrate heating" (J. Vac. Sci. Technol. B 14(6), November/December 1996, pages 3839 ff, by American Vacuum Society 1996) a general analysis of beam induced substrate heating and the dependencies of heating and beam power and pattern density.

It is an object of the present invention to provide a method for defect and conductivity engineering of an individual portion in a conducting nanoscaled structure by aiming and targeting only said individual portion of the structure and leaving other parts of the conducting nanoscaled structure essentially unchanged, whereby this method should be fast, reliable and selective over a large area and, according to a further aspect, should provide the possibility to be combined with preferably automated defect and conductivity inspection methods.

This object is achieved by a method according to claim 1 and the use of a scanning electron microscope SEM according to Claim 18. Claims 2 to 17 are referring to specific advantageous realizations of the inventive method, claims 19 and 20 refer to advantageous embodiments of the scanning electron microscopy used for such a method.

According to the invention a method for defect and conductivity engineering of an individual portion in a conducting nanoscaled structure is provided, which generates heat-induced migration, melting, sputtering and/or evaporation of conductive material of the nanoscaled structure by directing a focused electron beam on this individual portion of the structure to be engineered.

The beam-inducted heating of the targeted conducting structure is the origin for the material modification effect, namely migration, melting, sputtering and/or evaporation. The method according to the present invention thereby provides an easily applicable method for repairing of defects, the enhancement and the tuning of conductivity along nanoscaled conducting structures of a wide variety, especially as the inventive method is adaptable to the different nanoscaled conducting structures and its physical properties, especially its melting points etc.

By using a focused electron beam it is possible to treat defects, i.e. segments of reduced conductivity or even gaps, reducing the conductivity to zero, without influencing other parts of the nanoscaled conducting structure. An engineering of a nanoscaled structure according to specific requirements, especially the constructing of specific nanoscaled designs is therefore possible, which is especially important for providing nanoscaled structures as a basis for manufacturing of miniaturized processing data devices, e.g. integrated areas of nanometer-scaled circuits e.g. from metal and semiconductor nanocrystals or other materials.

The invention is especially useful for providing conducting nanoscaled structures of DNA-templated nanowires, which were made highly conductive by selective, self-assembly driven metallisation or e.g. polycrystalline metal nanowires.

The above mentioned conducting nanoscaled structures comprising DNA nanowires are usually prepared on silicon substrates having an oxide thickness between 2 nm and 500 nm, however the inventive method is also applicable to conducting nanostructures on various kinds of substrate materials.

The inventive method can further be used to fuse together grain boundaries or individual nanocrystals, e.g. in order to increase the conductivity of a granular conducting structure. Also these grain boundaries or individual nanocrystals should be understood as "conducting nanoscaled structures" in the sense of this invention.

The inventive method is preferably applicable to a gap region in a conducting nanoscaled structure, whereby the focused electron beam is directed onto the gap region covering also the defect edges. Thereby the generated heat induced migration by melting, sputtering and/or evaporation of the conductive material at this defect edges leads to a filling of the gap and a connection of said defect edges, thereby closing the gap and providing a conductive nanoscaled structure.

The parameters of the focused electron beam are dependent on the material of the conducting nanoscaled structure as well as on the desired effect and can be adopted to the nanoscaled structure to be engineered.

Preferred beam voltages, especially for above mentioned DNA-templated nanowires, which can be e.g. metallised by selective plating with gold, but also for other materials and nanoscaled structures, are preferably in a range of 0.1 to 50 kV, especially between 3 and 10 kV and most preferably in the range of about 5 kV.

Preferred current densities are in the range of 1 to 100 $A/cm^2$, especially in the range of 10 to 50 $A/cm^2$ and most preferably in the range of about 20 $A/cm^2$. Preferred absolute beam currents are in the range of 10 to 1000 pA, preferably in the range of 20 to 500 pA, most preferably in the range of 200 to 400 pA. The application of such low energy beams is sufficient to realize the engineering, especially the defect repair and enhancement of the conductivity, within short application times, preferably in the area of about 2 to 30 seconds, normally between 10 to 20 seconds, especially in the case of the above mentioned metallised DNA nanowires, however the application time or scanning time is of course dependent on the nanoscaled structure material and the substrate material. Depending on the material properties, especially the thermal conductivity of the material to be engineered, application time can also rise up to one minute or in specific cases also up to several minutes.

A scanning window for the electron beam is preferably adjusted to the defect region (or region to be engineered in general), whereas the defect, or the region to be engineered, has to be centered within the scanning window. The scan window can have different geometrical forms, having typically a diameter between 10 and 100 nm in case of generally circular scan windows or side lengths of between 10 to 100 nm in case of rectangular scan windows. Preferably the diameter or the side lengths of the scanning window are between 50 nm and 100 nm.

It is however also possible to utilize smaller dimensions for the scanning windows and to also omit scanning of the electron beam but directly focussing the electron beam on a particular spot on the center or position to be engineered. Generally in case of scanning, the diameter of the electron beam is smaller than in case of a direct focussing of the electron beam.

Typical electron beam diameters are in the range 1 to 50 nm, especially in the range of 5 to 20 nm, preferably at about 10 nm.

A preferred electron dose is in the range between 1 to 500 $mC/cm^2$, preferably between 10 and 200 $mC/cm^2$, especially in the range of above 50 $mC/cm^2$ to 100 $mC/cm^2$ for one step of engineering of a particular region of the nanoscaled structure. The electron dose can however also range up to several tens of $C/cm^2$, preferably in the range of 10 to 50 $C/cm^2$.

Especially with relative high electron doses of above 20 $mC/cm^2$ very high surface temperatures can be achieved, causing the above described structural changes in the metallised nanostructure by migration, melting, sputtering and/or evaporation of the conductive material.

According to an independently inventive aspect of the invention it is also possible to inspect a conducting nanoscaled structure by directing an electron beam onto the part of the structure to be inspected and detecting backscattered electrons.

In this respect it is important to notice that the backscattered electrons carry the required electronic information about the surface, allowing the inspecting and investigation of the conductivity of the nanoscaled structure, whereas secondary electrons, generated by the primary electrons of the electron beam, do in general not provide useful contrast variations related to conductivity variations but normally carry only topologic information of the surface.

It is therefore preferred to implement a filter for detecting only the backscattered electrons, whereas the term "filter" in this sense has to be understood in its broadest possible sense, comprising e.g. specific detectors or specific detector arrangements or also one or more acceleration or retardation fields possibly in combination with different detector elements, in order to receive or calculate a signal or information only or also mainly based on the backscattered electrones.

The analysis of the backscattered electrons according to this aspect of the invention therefore provides a backscattered electron picture having contrast information being directly related to the presence of defects in a conducting nanoscaled structure or the conductivity in this nanoscaled structure respectively.

Although this inspection of a conducting nanoscaled structure by directing an electron beam onto the part of the structure to be detected is, as mentioned above, an independent inventive aspect of the invention, special advantages are achieved by combining the method for inspecting conducting nanoscaled structures and a method for defect and conductivity engineering of such a conducting nanoscaled structure, as explained above, by utilizing a focused and directed electron beam.

In a very easy manner and by utilizing only one device it is therefore possible to first check and inspect a conducting nanoscaled structure and to directly repair or engineer certain parts of the nanoscaled structure after having detected certain defects, or areas/portions that should be "amended" or engineered.

According to an especially advantageous realization of the invention both methods for inspecting and engineering are applied together in a sequence, preferably alternating, so that first a nanoscaled structure will be examined and, in case of defects, engineered, whereby after an engineering step again inspecting of the amended nanoscaled structure is performed, in order to avoid an "over-engineering", i.e. an undesired over-treatment leading to over-heating and undesired migration, melting, sputtering and/or evaporation of the conductive material.

It is also possible to perform the step of inspecting said conducting nanoscaled structure simultaneously to the generating of the heat-induced migration, melting, sputtering and/or evaporation.

It has to be mentioned that in general a lower power for the electron beam has to be used for inspecting the conducting nanoscaled structure in comparison to the engineering, in order to avoid any amending or engineering effect when only inspecting the nanoscaled structure or to keep at least such effects as low as possible, when only an inspecting of the nanoscaled structure is desired.

The preferred electron beam parameters for engineering have been already referred to above, in case of an electron beam for inspecting, the electron dose should be normally below several $mC/cm^2$, preferably below 10 $mC/cm^2$. Preferred electron doses are in the range of 1 to 5 $mC/cm^2$, whereas also very small electron doses below 1 $mC/cm^2$ are possible, e.g. preferably in the range of 1 to 500 $\mu C/cm^2$. When comparing the electron dose for inspecting with the electron dose for engineering, the engineering electron dose is preferably about a magnitude higher, preferred engineering electron doses do exceed the inspecting electron doses by a factor 5 to 100, preferably by a factor 10 to 50 and in a most of the cases by a factor 10 to 30.

The beam current for inspecting is preferably between 10 to 500 pA, more preferably between 20 to 100 pA and especially in the range of about 50 pA.

A preferred scanning window is about in the same range as a preferred scanning window for engineering, having side lengths of about 10 to 100 nm, preferably between 50 nm and 100 nm in case of a rectangular form. Although it is also possible to omit scanning also in inspecting modus and to directly focus the electron beam on a particular spot on a portion to be inspected, such an operation is normally not preferred during inspection but only in an engineering modus.

Preferred acceleration voltages in an inspecting modus are in the range of 0.1 to 50 kV, especially between 1 and 10 kV, thereby comparable to the accelerating beam voltage in case of an engineering electron beam, but normally slightly lower, preferably lower by a factor of about 1.5 to 3.

In case of an inspecting modus it is especially preferred that the nanoscaled structure is attached to an electrode, which serves as an electron reservoir. This will greatly enhance the image contrast, if defects are present. Alternatively, the nanoscaled structure could be just attached to a thin conducting line, which provides a certain voltage bias of the nanoscaled structure from outside. This would also lead to a certain contrast enhancement.

On the other hand, for the engineering, as mentioned above, such an attachment of the nanoscaled structure to an electrode or a thin conducting line is not required, but it is also possible to have the nanoscaled structure attached to an electrode also during engineering without negatively influencing the engineering process.

In a preferred realization of the method or the step of inspecting of said conducting nanoscaled structure a beam of primary electrons is accelerated in a high voltage electrical field and the electrons are then retarded by a retarding field before reaching the conducting nanoscaled structure, whereby in a preferred embodiment a first detection means only detects backscattered electrons preferably accelerated by said retarding field in direction to said first detection means, and a second detection means detects a mixture of both secondary electrons and backscattered electrons, whereby a backscattered electron signal or backscattered electron picture can be determined especially by comparison of the measurement of the both detection means.

In one embodiment the retardation field retards the primary electrons of the electron beam to an energy of about 2% to 10% of its maximum energy generated by said high voltage electrical field.

It has to be mentioned that the retarded beam can actually have beam voltages between about 100 V and 10 keV, and can therefore be below 1% and up to 100% of the maximum energy generated by above mentioned high voltage electric field, whereas the retarded beam has been voltages preferably between 10% and 100%.

The object of the invention is further solved by the use of a scanning electron microscope SEM system for a method as described above, whereas the scanning microscope having a filter for detecting backscattered electrons and secondary electrons and having a filter for detecting essentially only backscattered electrons (whereas "filter" in the sense of this invention relates to any means leading to a "backscattered electron picture" or respective signal, as mentioned above).

Further features and advantages of the present invention will become more apparent in view of the following drawings.

Figure 1:
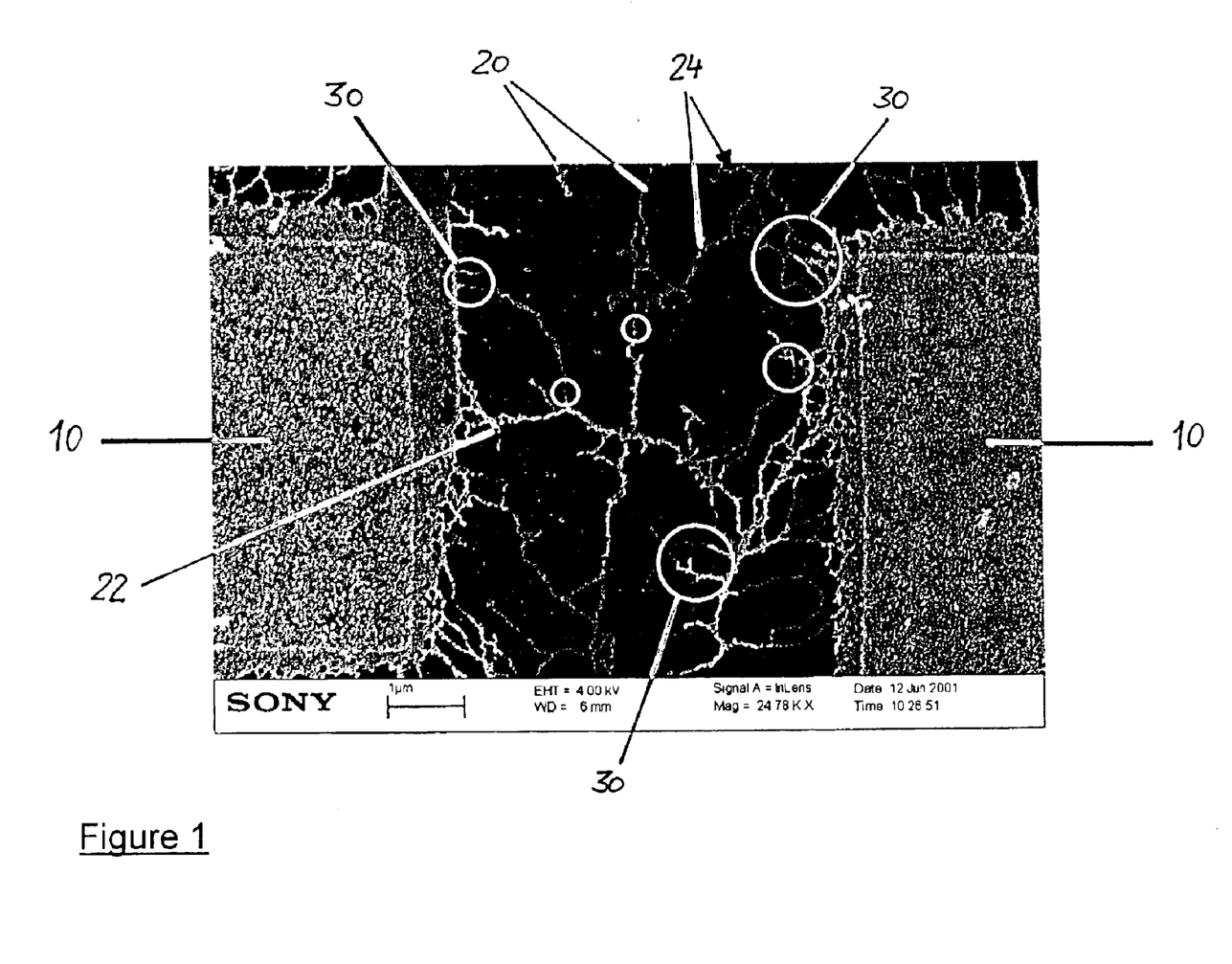
FIG. 1 shows a backscattered electron picture of nanoscaled metallised DNA-wires connected to electrons.

FIG. 1 shows a backscattered electron picture of two electrodes 10 and a system of DNA-templated nanowires 20, 22, 24, which were made highly conductive by selective, self-assembly driven metallisation, whereas this picture is taken by directing an electron beam onto the system to be inspected and by detecting the backscattered electrons according to one aspect of the invention. The backscattered picture shown in FIG. 1 has been achieved with a beam voltage of 4 kV and a working distance WD of 6 mm.

In the system shown in FIG. 1, the DNA-templated nanoscaled wires are randomly aligned, however, for circuits in e.g. nanoelectronics, better defined alignments can be realized.

As clearly visible in FIG. 1, the DNA-templated nanowires 20, 22, 24 do show either a bright contrast or a weak contrast. Those wire parts 22 which are electrically connected to at least one electrode 10 show a bright contrast whereas those wire parts 24, which obviously have no direct electrical contact to one of the electrodes 10, appear with a weak contrast.

A number of defects 30, indicated in FIG. 1 by white circles, are also clearly visible in FIG. 1.

Figure 2:
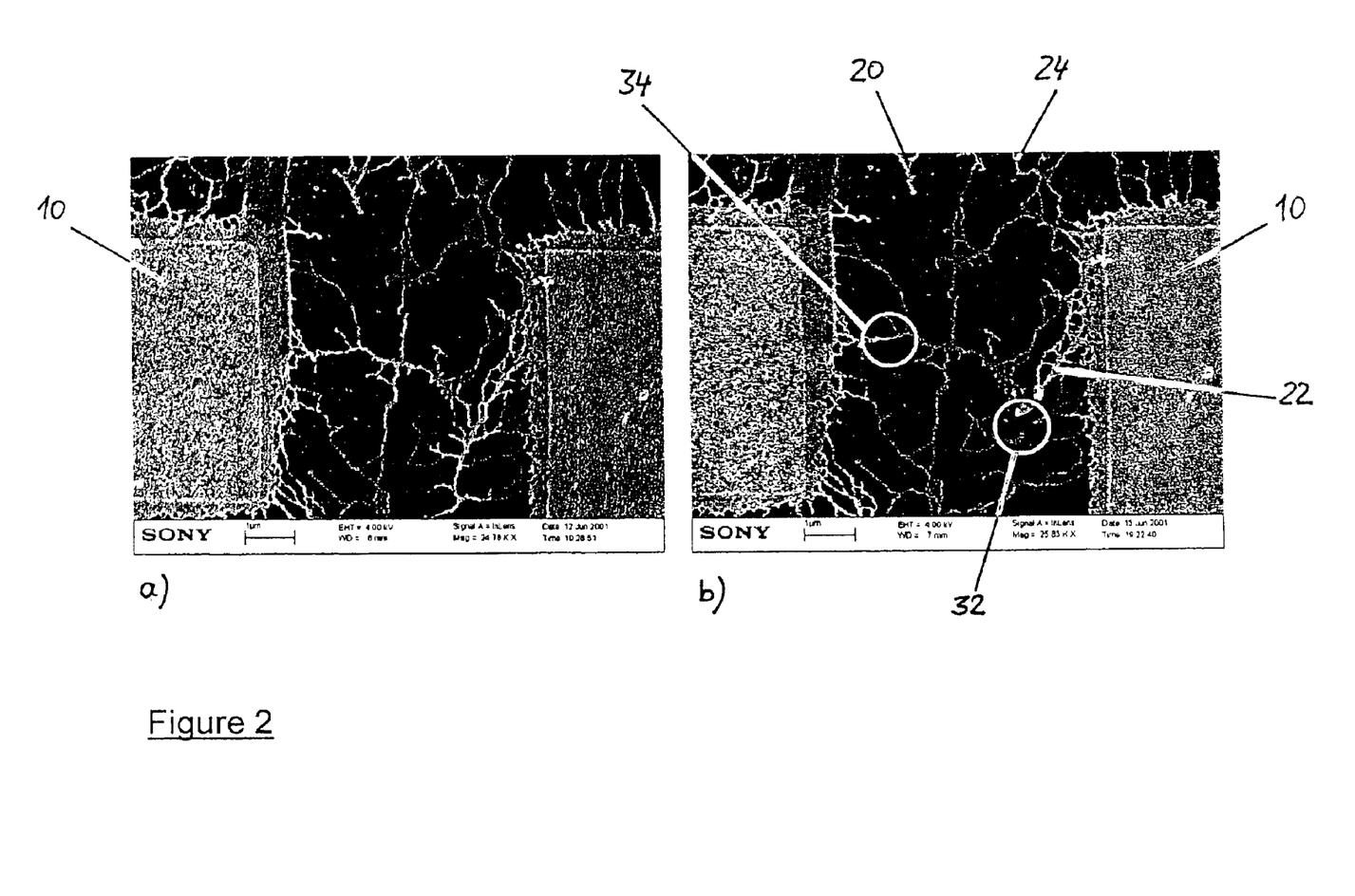
FIGS. 2A and 2B show a backscattered electron picture of the system shown in FIG. 1 before (FIG. 2a) and after cutting a nanoscaled metallised DNA-wire (FIG. 2b)

FIG. 2a shows the system of FIG. 1 for better comparison and FIG. 2b shows the same system after an additional defect 32, indicated also by a white circle, has been introduced into the system by an AFM (atomic force microscope) tip assisted cutting of a conducting part of the DNA-templated wire.

As now clearly visible by generating this additional defect 32 some DNA-templated wires 22 are disconnected from the electrodes 10 by said additionally introduced defect 32 and do thereby appear only with a weak contrast.

Due to the additionally introduced defect 32, a further defect 34 was discovered, clearly visible due to the DNA-templated wire 22 showing a bright contrast on the left side of the defect 34 and the DNA-templated wire 22 showing a weak contrast on the right side of the defect 34.

Figure 3:
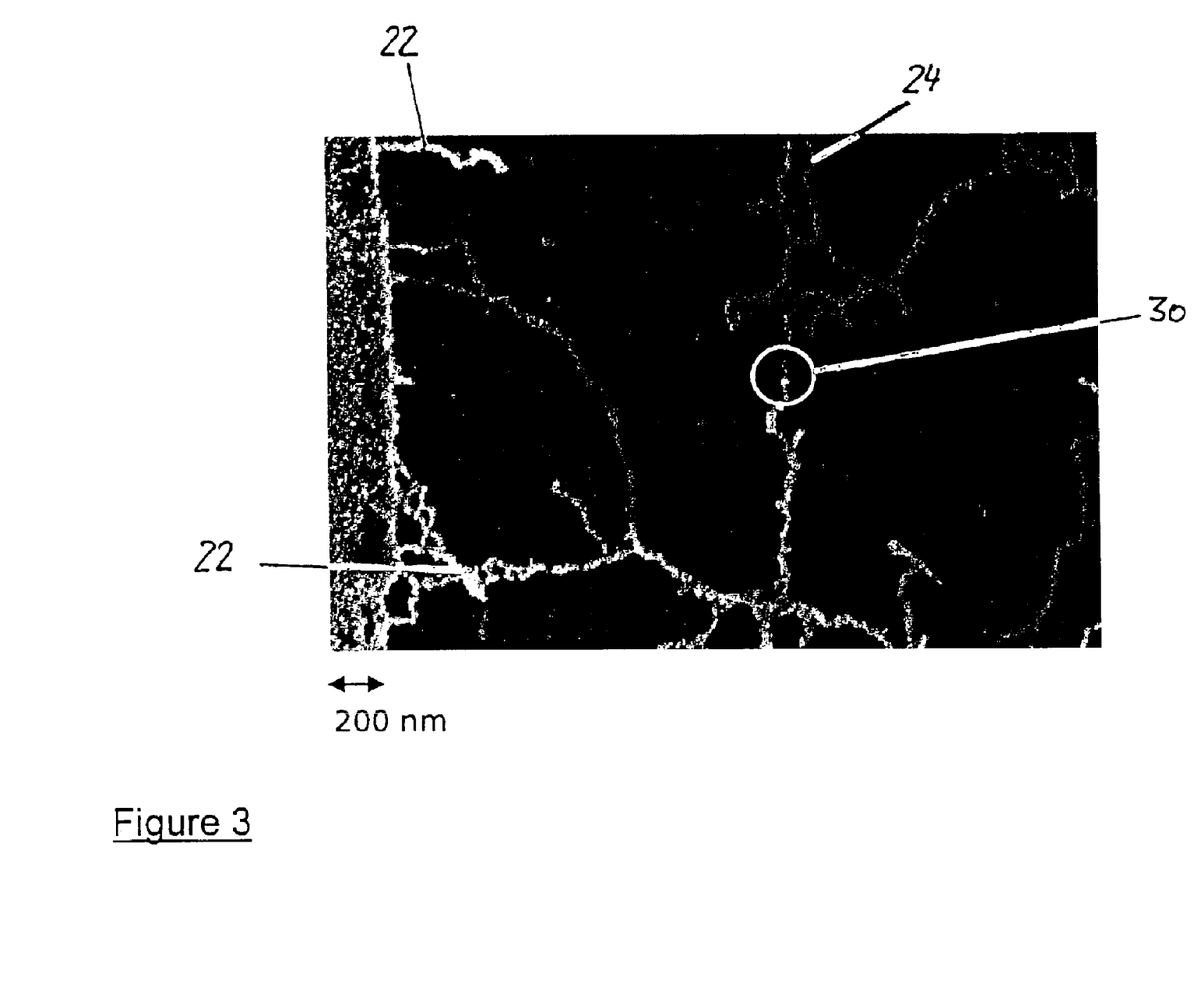
FIG. 3 shows an enlarged detail of a backscattered electron picture of a nanoscaled metallised DNA wire system with a defect in a single metallised DNA-templated nanowire.

FIG. 3 shows an enlarged detail of a backscattered electron picture with DNA-templated nanowires 22 connected to electrodes (not shown) and therefore showing a bright contrast and with DNA-templated nanowires 24, not being connected to electrodes (not shown) and therefore showing only a weak contrast. As clearly visible at about the center of the backscattered electron picture of FIG. 3 a defect 30 could be detected, separating nanowires 24 not being in contact with an electrode (weak contrast, above defect 30) and nanowires 22, being connected to an electrode (bright contrast, below defect 30).

Figure 4:
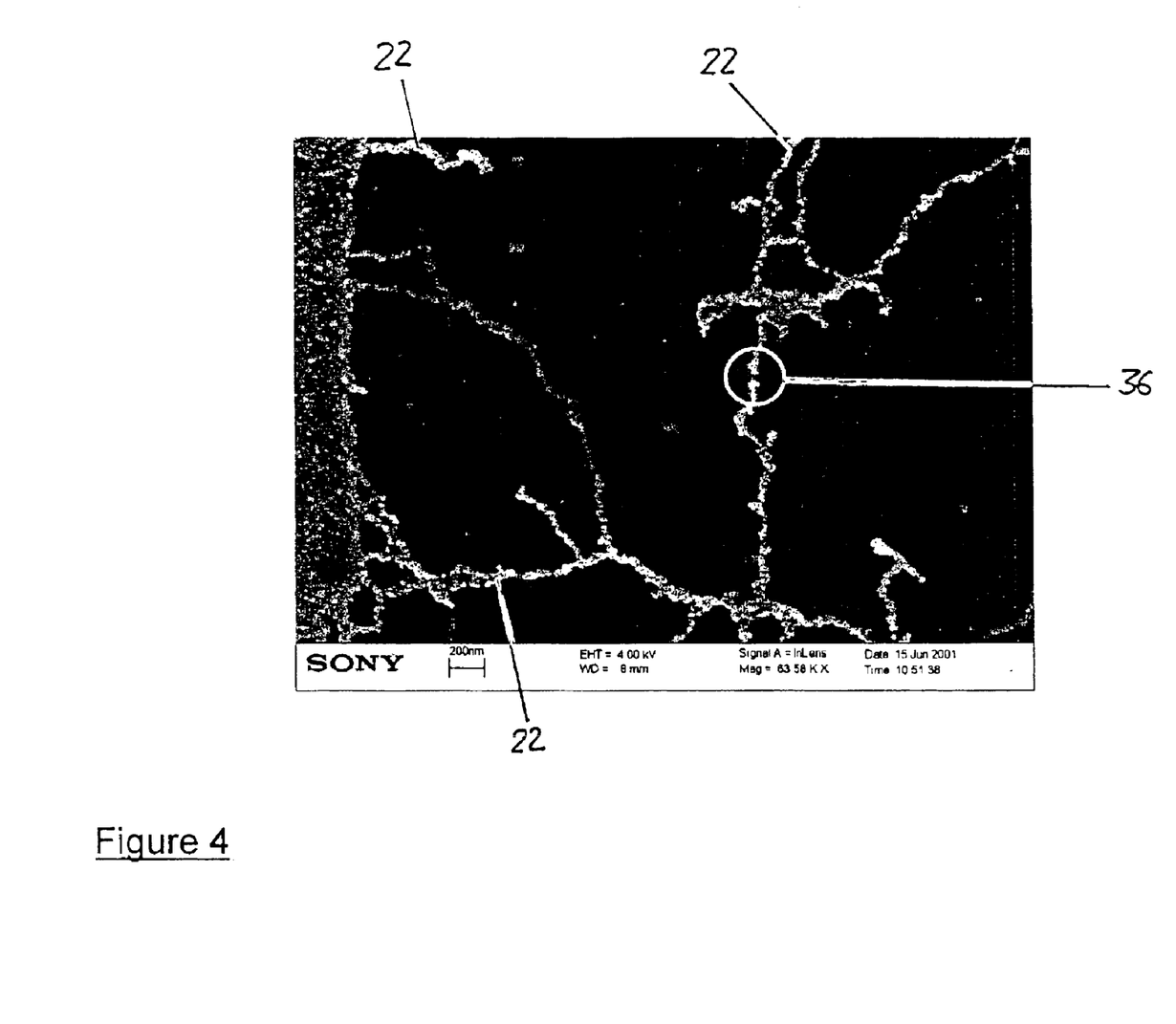
FIG. 4 shows the same enlarged detail of the backscattered electron picture of the system shown in FIG. 3 after the defect in the single metallised DNA-templated nanowire has been repaired.

By applying the inventive method and utilizing a focused electron beam with an energy of 4 kV, WD 6 mm, beam current approximately 20 pA, aperture 30 µm, scanning window approximately 50 nm by 100 nm, scanning time 10 seconds, the defect 30 has been bridged so that the defect has been repaired (designation number 36 in FIG. 4).

In FIG. 4 both above and below the repaired defect 36 the DNA-templated nanowires 22 do now show a bright contrast in the backscattered electron picture, clearly indicating that the DNA-templated nanowires 22 both below and above the repaired defect 36 are now connected to one electrode, indicating that the defect (30, see FIG. 3) has clearly been repaired and conductively bridged.

Although the examples shown in the figures do show the effects of the inventive method by showing backscattered electron pictures, it has to be understood that the method for defect and conductivity engineering can also be applied independently on the method or the step of inspecting said conductivity nanoscaled structure by a backscattered electron picture, although this combination is, as mentioned above, preferred, as by a combination leading to inventive combinatory advantages. The conducting nanoscaled structure can however e.g. also be inspected, in order to e.g. find defects or segments of reduced conductivity, by e.g. optical or infrared variations or by electrical measurements or also by structural investigations using atomic force microscopy.

Figure 5:
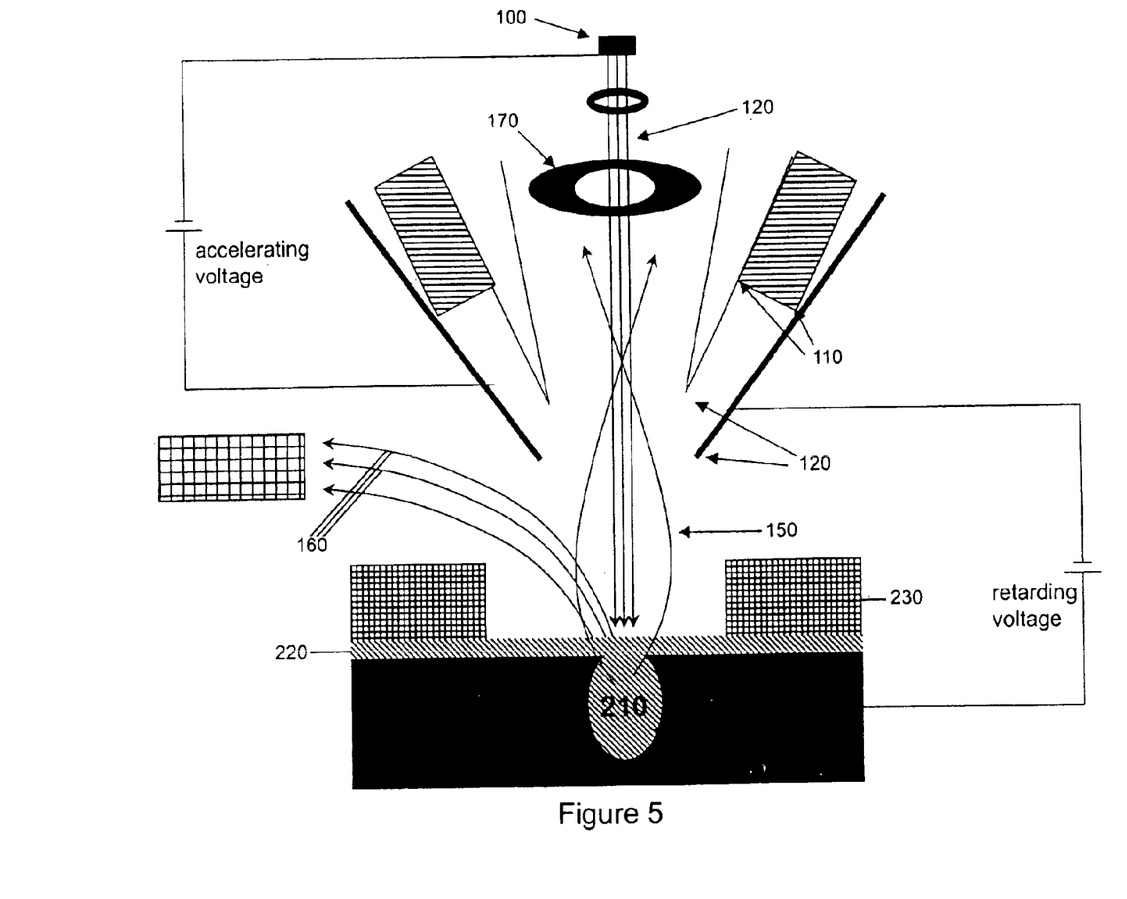
FIG. 5 shows a schematic drawing of an embodiment SEM adopted to the inventive method with indicated paths of backscattered and secondary electrons.

FIG. 5 schematically shows some of the main elements of an embodiment of an SEM system used for the inventive method. A primary electron beam 102 is generated by an electron source 100, whereas the acceleration voltage can be adjusted in a wide area, being preferably, according to the inventive method, in the range of 1 kV to 10 kV.

The primary electron beam 102 is directed onto a sample 200 having a nanoscaled structure. The sample 200 is shown only schematically, having two electrodes 230 attached on the upper surface of the sample 200.

As schematically indicted in FIG. 5, the primary electron beam 102 directed onto the sample 200 shows effects mainly within an interaction volume 210 in the sample. The interaction volume 210 is shown only schematically in this drawing and is dependent of the material of the sample 200 and the parameters of the electron beam.

The primary electron beam 102 generates backscattered electrons 150 and secondary electrons 160, whereas the backscattered electrons 150, having essentially the same energy as the primary beam electrons 102, are backscattered essentially in a direction being opposite to the primary electron beam, whereas the secondary electrons 160 are generated in a sideward direction, as schematically indicated in FIG. 5.

The direction of the electrons is controlled by magnetic lenses 110 and electrostatic lenses 120 of the SEM.

The SEM shown in FIG. 5 comprises an annular detector 170 for backscattered electrons 102, so that a signal for the backscattered electrons can be taken directly and a "backscattered electron picture" can be generated.

Although not shown in FIG. 5, the SEM can of course also comprises a detector for the secondary electrons 160 preferably a lateral detector. It should be mentioned at this point that the secondary electrons 160 are generated only in a secondary emission region 220 in the upper surface region of the sample 200 as schematically indicated in FIG. 5.

The features of the present invention disclosed in the specification, the claims and/or the drawings, may both separately and in any combination thereof, be material for realising the invention in various forms thereof.

What is claimed is:

1. A method for repairing defect edges of a gap region of a nanoscaled structure to provide conductivity therethrough, said method comprising the steps of: generating heat-induced migration, melting, sputtering and/or evaporation of conductive material of the nanoscaled structure, said generating step comprising the step of directing a focused electron beam on said gap region covering said defect edges of the nanoscaled structure being engineered so as to lead to film of the gap region and connection of said defect edges thereby providing a conductive nanoscaled structure.

2. Method according to claim 1, characterized in that said gap region of the nanoscaled structure to be engineered, whereby the focused electron beam is directed onto said gap region including defect edges and generates heat-induced migration, melting, sputtering and/or evaporation of the conductive material of the defect edges into the gap between said defect edges, filing the gap and connecting said defect edges.

3. Method according to claim 1, characterized in that the electron beam has an accelerating beam voltage between 0.1 kV and 50 kV.

4. Method according to claim 1, characterized in that the electron beam has a current density of 1 to 100 A/cm$^2$.

5. Method according to claim 1, characterized in that the electron beam has an absolute beam current of 10 to 1000 pA.

6. Method according to claim 1, characterized in that the electron beam will be applied in a scanning modus with a scanning window having a diameter or side lengths between 10 nm and 100 nm.

7. Method according to claim 6, characterized in that the gap region of the conducting nanoscaled structure to be engineered is centered in the scanning window.

8. Method according to claim 1, characterized in that the electron beam has a beam diameter of 1 to 50 nm.

9. Method according to claim 1, characterized in that a working distance to the conducting nanoscaled structure is between 2 mm and 10 mm.

10. Method according to claim 1, characterized in that an electron doses of totally 1 to 500 mC/cm$^2$ is applied for the engineering of one gap region.

11. Method according to claim 1, also including a step of inspecting said conductivity nanoscaled structure by directing an electron beam onto a portion of the conducting nanoscaled structure to be inspected and detecting backscattered electrons.

12. Method according to claim 11, characterized in that during the step of inspecting, a beam of primary electrons is accelerated to high potential by an electric field and retarded by a retarding field before reaching the conducting nanoscaled structure.

13. Method according to claim 12, characterized in that said retarding field retards the primary electrons of the electron beam to an energy of 2% to 10% of its maximum energy generated by said electric field.

14. Method according to claim 11, characterized in that a first detection means only detects backscattered electrons and a second detection means detects both secondary electrons and backscattered electrons.

15. Method according to claim 11, characterized in that the electron beam during the step of inspecting said conducting nanoscaled structure applies an electron doses of totally 0.1 to 10 mC/cm$^2$.

16. Method according to claim 11, characterized in that the electron beam during the step of inspecting has an absolute beam current between 1 pA and 500 pA.

17. Method according to claim 11, characterized in that the electron beam during the step of inspecting has an accelerating beam voltage between 0.01 and 50 kV.

18. Use of a scanning electron microscope (SEM) system having a filter for detecting backscattered electrons for a method according to claim 1.

19. Use of a scanning electron microscope system according to claim 18, characterized in that the scanning electron microscope is designed to have an aperture between 10 $\mu$m and 100 $\mu$m.

20. Use of a scanning electron microscope system according to claim 18, characterized in that the filter for detecting backscattered electrons comprises an annular backscattered electrons detector.

21. A method for defect and conductivity engineering of an individual portion in a conducting nanoscaled structure comprising the steps of: generating heat-induced migration, melting, sputtering and/or evaporation of conductive material of the nanoscaled structure, said generating step comprising the step of directing a focused electron beam on said individual portion of the nanoscaled structure being engineered; inspecting said conductivity nanoscaled structure by directing an electron beam onto a portion of the conducting nanoscaled structure to be inspected and detecting backscattered electrons with a beam of primary electrons being accelerated to high potential by an electric field and retarded by a retarding field before reaching the conducting nanoscaled structure wherein the retarding field retards the primary electron of the electron beam to an energy of 2% to 10% of its maximum energy generated by said electron field.

* * * * *